US007697686B2

(12) United States Patent
Puiatti et al.

(10) Patent No.: US 7,697,686 B2
(45) Date of Patent: Apr. 13, 2010

(54) UNIT FOR MANAGING AUDIO/VIDEO DATA AND ACCESS CONTROL METHOD FOR SAID DATA

(75) Inventors: Jean-Michel Puiatti, Châtelaine (CH); André Nicoulin, Lausanne (CH); Nicolas Fischer, Versoix (CH); Guy Moreillon, Orjulaz (CH); Fabien Gremaud, Bussigny (CH); Michael John Hill, Coppet (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 1177 days.

(21) Appl. No.: 11/284,101

(22) Filed: Nov. 22, 2005

(65) Prior Publication Data

US 2006/0109982 A1 May 25, 2006

(30) Foreign Application Priority Data

Nov. 24, 2004 (EP) .................................. 04106029

(51) Int. Cl.
*H04N 7/167* (2006.01)
(52) U.S. Cl. .................. 380/239; 380/216; 348/E7.056; 348/E7.061; 386/E5.004
(58) Field of Classification Search .................. 380/200, 380/216, 239; 348/E7.056, E7.061; 386/E5.004
See application file for complete search history.

(56) References Cited

U.S. PATENT DOCUMENTS

| 5,937,067 | A * | 8/1999 | Thatcher et al. ............. 380/212 |
| 6,286,103 | B1 | 9/2001 | Maillard et al. |
| 7,227,954 | B2 * | 6/2007 | Stransky ..................... 380/231 |
| 7,228,439 | B2 * | 6/2007 | Sasselli ....................... 713/193 |
| 7,440,571 | B2 * | 10/2008 | Sasselli et al. .............. 380/264 |
| 7,466,826 | B2 * | 12/2008 | Andreaux et al. ........... 380/277 |
| 2002/0044658 | A1 | 4/2002 | Wasilewski et al. |
| 2002/0114465 | A1 * | 8/2002 | Shen-Orr et al. ............ 380/231 |
| 2003/0182579 | A1 * | 9/2003 | Leporini et al. ............. 713/201 |
| 2005/0254648 | A1 * | 11/2005 | Nahum et al. ............... 380/201 |

(Continued)

FOREIGN PATENT DOCUMENTS

| WO | WO 99/30499 | 6/1999 |
| WO | WO 00/57636 | 9/2000 |

OTHER PUBLICATIONS

International Search Report.

*Primary Examiner*—Gilberto Barron, Jr.
*Assistant Examiner*—Hadi Armouche
(74) *Attorney, Agent, or Firm*—Harness, Dickey & Pierce, P.L.C.

(57) ABSTRACT

Example embodiments are directed to a digital audio/video (AV) data processing unit and a method of controlling access to the digital AV data. The processing unit of AV digital data includes a deciphering unit of the AV data, a decompression unit, an input/output interface of the processed AV data and communication device towards a security module. The deciphering and decompression units respectively include an encryption unit and a decryption unit, each having at least one personal key and a common encryption key. Deciphering the AV data using the control words and re-encrypting the deciphered AV data occurs only after a successful verification of the control word and the common key. After temporary storage, the re-encrypted AV data cannot be decrypted by the decryption unit unless the common key has been positively verified by the security module by way of a random number generated by the decryption unit.

24 Claims, 1 Drawing Sheet

U.S. PATENT DOCUMENTS

2006/0023876 A1* 2/2006 Ksontini et al. ............... 380/28
2006/0136718 A1* 6/2006 Moreillon ................... 713/155
2006/0161969 A1* 7/2006 Moreillon ..................... 726/3
2007/0101149 A1* 5/2007 Moreillon et al. ........... 713/182

* cited by examiner

UNIT FOR MANAGING AUDIO/VIDEO DATA AND ACCESS CONTROL METHOD FOR SAID DATA

The present application hereby claims priority under 35 U.S.C. §119 on European patent application number EP 04106029.4 filed Nov. 24, 2004, the entire contents of which is hereby incorporated herein by reference.

TECHNICAL FIELD

The present invention relates to the domain of digital audio/video data processing units. These units are included in different multimedia equipments such as for example personal computers, mobile equipments or digital pay television decoders provided with dynamic and static memories (RAM Random Access Memory, EEPROM Electrically Erasable Programmable Read-Only Memory, hard disk, etc.). This invention also describes an access control method to this audio/video data before their output to a peripherical operated by a user.

BACKGROUND

A digital audio/video data processing unit such as a digital television decoder or "set top box" generally includes a main module which contains several or all of the essential functionalities for the decryption, the decompression and the interfacing of the audio/video data received from a cable, wireless or satellite broadcasting network or from a public telephone line.

The module comprises amongst others a central unit managing a deciphering unit, a decompression unit and different interfaces that allow the module to communicate with different external peripherals associated to the decoder such as a security module or multimedia equipments. The majority of these elements are connected to a central bus inside the module. This bus also links external memories for the temporary storage of work data or for the storage of audio/video contents for further use.

The decryption process of the audio/video data stream coming from the broadcasting network performed by the deciphering unit, needs intermediate data storage in a memory with a relatively large capacity separated from the main module. This stored data, which can be in the form of audio/video data blocks, is then decompressed before its routing towards an output interface that allows its visualization on a television screen or its recording on a magnetic or optical recording medium such as a hard disk or a compact disk (CD Compact Disc, DVD Digital Versatile Disc or other).

The presence of this decrypted data in a separate memory constitutes a protection failure of the compressed audio/video data. In fact, this data can be diverted and collected in order to be processed and distributed by an external third party system with the aim of abusive exploitation.

Moreover, data stored for future use, for example in a hard disk, can also be recovered and reproduced without the supplier's authorization, thus violating the regulations on copyright.

The document U.S. Pat. No. 6,286,103 describes a decoder of encrypted audio/video data wherein a security module deciphers the data and re-encrypts it before transmitting to the decoder. According to an embodiment, the transmission between the security module and the decoder is secured by way of a session key created from a random number generated by the decoder and encrypted with a key issued from the security module. This number, being combined with the data decryption key, varies frequently allowing preventing or rendering more difficult the decryption by a third party having obtained said decryption key fraudulently.

The document WO00/57636 describes various applications of security modules in form of cards personalized according to the categories of users. In particular, in a network of multimedia contents decoders, the deciphered data are re-encrypted. The decryption is possible only when the decoder is equipped with a duly authenticated card containing parameters specific to the user. In an embodiment, a card is authenticated by using a random number generated by the decoder and transmitted to the card. The latter encrypts the random number with a private key and resends it to the decoder, which decrypts it with the corresponding public key. A comparison between the generated number and the received number allows verifying the authenticity of the card.

SUMMARY

An aim of at least one embodiment of the invention is to reduce or even overcome at least one of these drawbacks by reducing or even preventing decrypted data from becoming accessible to fraud attempts or unauthorized reproductions. In other words, the decrypted data cannot be utilized without the supplier's control.

An aim may be achieved by a processing unit for digital audio/video data encrypted with one or several control-words coming from control messages, comprising a unit for deciphering the audio/video data, a decompression unit, an input/output interface of the processed audio/video data and communication device towards a security module, the deciphering and decompression units comprising respectively an encryption unit and a decryption unit each provided with at least one personal key and one common encryption key, characterized in that it comprises means for secure transmission of the common key and of the control word extracted from a control message between the security module, the deciphering unit and the encryption unit, said means using a key associated to the personal key of the encryption unit.

means for deciphering audio/video data with the control word associated to the deciphering unit, means for re-encrypting said deciphered data with the common key associated to the encryption unit, a memory unit able to temporarily store the audio/video data re-encrypted with the common key, means for secure transmission of re-encrypted audio/video data to the decryption unit able to communicate with the security module and with a random number generator associated to the decryption unit, said means using the personal key of the decryption unit.

means for verification of the integrity of the random number, said means authorizing, when the result of the verification is positive, the decryption by the decryption unit of the audio/video data with the common key.

A security module is considered to be a tamper-proof device containing different encryption/decryption keys as well as user's specific data that defines the rights that he/she has purchased for the use of audio/video data. The security module can take different forms such as a smart card inserted into a reader, an integrated circuit welded onto a mother board, a card of the SIM type found in mobile telephones, etc.

The audio/video data of a broadcasted stream is deciphered by the deciphering unit then it is entirely or partially encrypted with the common key by the encryption unit associated to the deciphering unit. This data is then exported from the processing unit towards external units such as a temporary memory storing the provisional stream in organization process intended to the MPEG decompressor, or to all other internal or external peripherals such as a USB port, Firewire or hard disk.

This temporary memory is made of a random access memory of the RAM type for temporary data storage during processing. For long-term storage, the data is forwarded to a hard disk or DVD recorder. At the time of reading one or the other memory unit, the data is transmitted to the decompression unit to which the decryption unit is associated, the latter requiring the common key associated to this data.

This common key can be stored in numerous ways, for example simply in the security module. According to an example embodiment of the invention, it is encrypted with a local key of the security module and stored with the data. The cryptogram comprising this common key will preferably contain a reference to the data, by way of an identifier. At the time of decrypting of the data, this cryptogram is submitted to the security module for verification.

This local key can be replaced by a network key, thus allowing the other members of this network to access the contents of the cryptogram and finally, to access the encrypted contents.

In a first step, the security module determines on the basis of the identifier, if the rights associated to these contents are valid, allowing thus the decompression then the visualization of the data on a display for example. It requires the sending of a random number by the decryption unit. Once this number has been received, the security module composes a message comprising at least the common key and the random number, this set being encrypted with the personal key of the decryption unit.

According to an alternative embodiment of the invention, a mathematical function is carried out on the random number, said function being known to the decryption unit. Thus the number received is either the random number itself or a direct function of the random number. The aim is to ensure that the number received corresponds to the random number generated by the decryption unit.

When this message reaches the decryption unit, it is decrypted with the personal key and the received random number is compared with that previously generated. The common key is used only if both numbers are identical.

When these two random numbers are different or if the result of the comparison is negative, the decryption unit can take several initiatives. The first resides in immediately blocking the data decryption. Another initiative resides in blocking in a deferred way, that is to say, after the decryption of a predetermined number of audio/video data blocks. The deferred blocking is desirable in order to render more difficult for a third party attempts to determine the random number by way of successive trials.

The aim of this supervision by the security module is to control the use of the data, in particular to be able to determine the number of data visualization. Therefore, at each data using, it is necessary to make a request to the security module, which can count and decide the use of the data.

Thanks to the presence of this random number in the loading mechanism of the common key, every unauthorized reproduction attack (replay attack) is prevented.

Another advantage of the processing unit according to at least one embodiment of the invention lies in the fact that no data in clear is stored in memory or made accessible from the outside regardless of the interface used.

The encryption of the data before its storage in the memory is carried out by way of a suitable algorithm that allows processing that is both fast and secure.

The processing unit of at least one embodiment of this invention forms a module that can be found in a personal computer as well as in a digital pay television decoder. In the case of the computer, the module, for example can be mounted on a card connected to the main bus or it can be mounted directly on the mother card.

In both cases there are memory units in the form of random access memory (RAM) or hard disks. In order to avoid unauthorized copies, the encrypted stored contents are decrypted under control of the security module.

In the case of digital television decoders, the common key used is generated either by the security module or by the head end of the broadcasting network and transmitted by way of managing messages EMM. In this case, this key is encrypted with the personal keys of the security module and then transmitted to said module. When changing channel for example, the common key can change, which involves the sending of a new management message EMM or the generation of a new key by the security module.

In the case of a personal computer, this key is either downloaded from a server of a management center or generated by the security module that can be in the form of a smart card or a "dongle" or an electronic key connected to a communication port of the personal computer (parallel port, serial port, USB etc.).

At least one embodiment of the invention also relates to an access control method to digital audio/video data received by a processing unit comprising a deciphering unit of the audio/video data, a decompression unit, an input/output interface of the processed audio/video data and communication device towards a security module, the deciphering and decompression units comprising respectively an encryption unit and a decryption unit using at least one personal key and one common encryption key, comprising:

reception, by the security module, of a control message containing at least one control word, obtaining, by the security module, of common key and generation of a cryptogram encrypted with the personal key of the encryption unit comprising the common key and the control word, transmission of the cryptogram to the deciphering unit, decryption with the key of said cryptogram, loading of the common key into the encryption unit and authorization of the deciphering of the audio/video data with the control word, deciphering of the audio/video data and encryption of said data by the encryption unit with the common key, transmission of said re-encrypted audio/video data to the decryption unit, selection by the security module of the common key specific to the audio/video data, transmission of a random number by the decryption unit to the security module, formation and subsequent transmission of a cryptogram encrypted with the personal key of the decryption unit containing at least the common key and the random number, reception of the cryptogram by the decryption unit, decryption of said cryptogram with the personal key of said decryption unit and verification of the integrity of the random number by comparing the received random number with the previously generated one.

loading of the common key and decryption of the audio/video data if the result of the comparison is positive.

BRIEF DESCRIPTION OF THE DRAWING

The invention will be better understood thanks to the following detailed description referring to the single enclosed FIGURE given as a non-limitative example embodiment.

DETAILED DESCRIPTION OF THE EXAMPLE EMBODIMENTS

Figure 1:
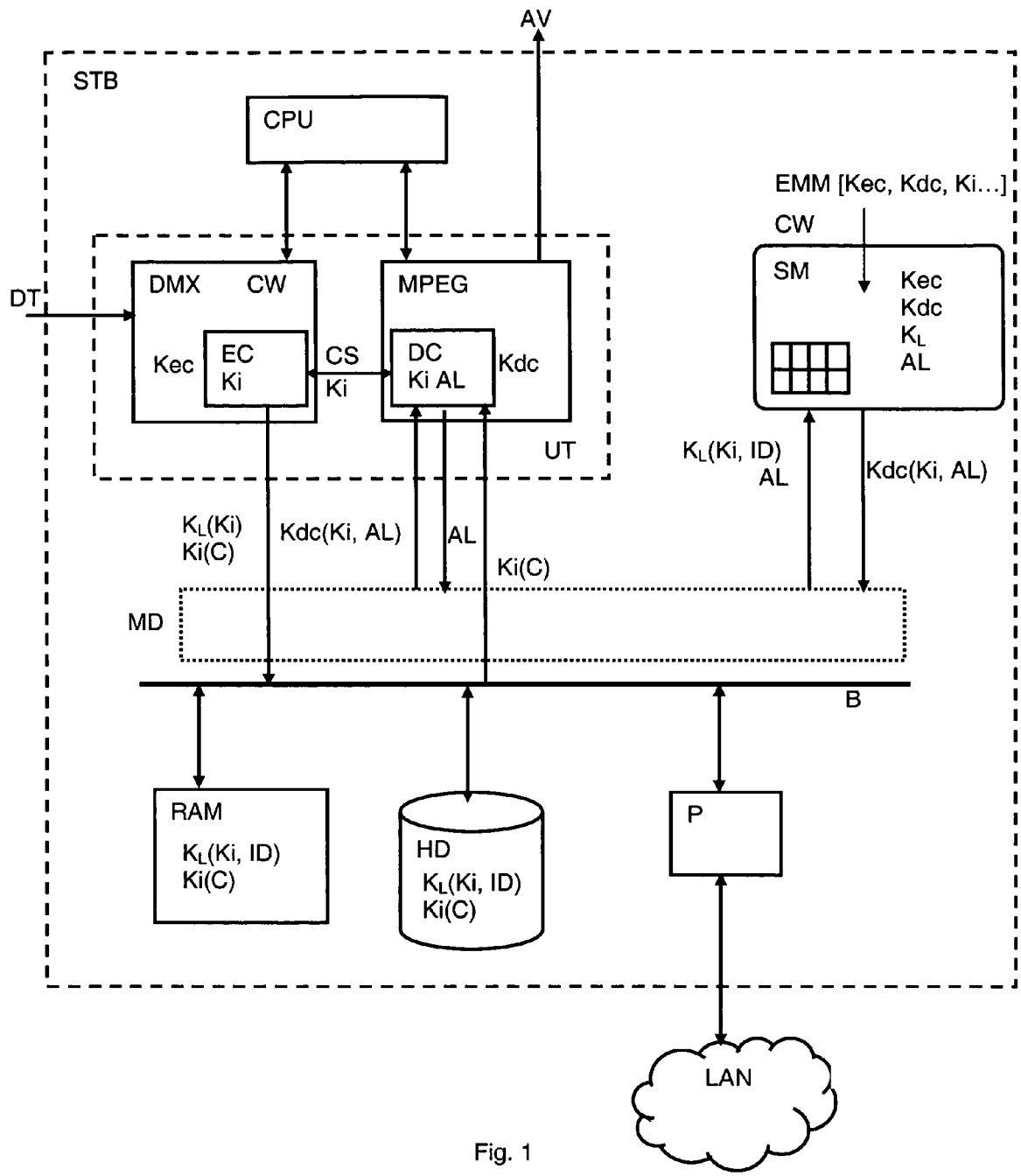
FIG. 1 represents a block diagram of an example of a processing unit included in a digital pay television decoder showing different elements external to this unit that are involved in the exchange of data and keys such as the memories and the security module.

FIG. 1 shows an application example of the processing unit according to an embodiment of the invention in a decoder (STB) of a digital pay television. The decoder (STB) includes a central processor (CPU) that manages certain functions of a deciphering unit (DMX), of a decompression unit (MPEG), and of interfaces communicating with the memories (RAM; HD) and the security module (SM). The deciphering unit (DMX) not only serves to decipher the incoming audio/video data stream, but also serves to convert this stream into different formats rendering the data that it contains compatible with the different applications of the decoder (STB).

The audio/video data (DT) is received by the deciphering unit (DMX) that deciphers said data with the aid of control-words (CW) coming from the control messages (ECM). The deciphered data is then encrypted by the encryption unit (EC) with a common encryption key (Ki). The data encrypted in this way can either be decrypted immediately or subsequently after storage in a memory unit such as a random access memory (RAM), a non-volatile memory of the EEPROM type or in a hard disk (HD). Following a request, the stored data is forwarded towards the decryption unit (DC) that deciphers said data, under control of the security module (SM), before its decompression by the decompression unit (MPEG).

A "middleware" (MD) software coordinates the working of the different software programs managing the units (DMX, MPEG, EC, DC) that can be included in the same module (UT). It also manages data access and data exchanges carried out by units (DMX, MPEG, EC, DC) from and to the security module (SM) and memory units (RAM, HD).

In a decoder, the central processor (CPU), considered as insecure, does not manage all the functions of the encryption (EC) and decryption (DC) units. In fact, in the case of a central processor that controls all the units, access to this processor will allow it to be reprogrammed or short-circuited with an external emulator in order to carry out the encryption and the decryption of the data with a known predetermined key. Therefore, to avoid such an intervention, several solutions can be envisaged:

Use of a central processor (CPU) whose architecture is based on a security structure of the "Trust Zone" type implemented in the material part of the core of the processor. This secured execution domain allows protection against software attacks against the internal and external memories of the processor circuit as well as those of the peripherals. The data and the secured code are marked and divided inside the central processor by maintaining a distinct hardware separation between secured and unsecured data. This separation allows the secured code and the data to be executed in a restricted environment in a secure and effective way with respect to an exploitation system by remaining invulnerable to attacks. A security control device switches the central processor from an unsecured state to a secured state in which the processor rises to higher privilege levels to execute the confidential code. It can thus carry out tasks such as authentication, signature calculations and secure transaction processing. It then becomes impossible to access the security of the central processor or to modify it by way of a virus or an unauthorized application.

Implementation of an architecture based on a system comprising two microprocessors of which the first executes the secured code while the second executes the unsecured operations. The first processor is insulated on the one hand against all access coming from the outside and on the other hand it is secured against any software attack coming, for example, from an unauthorized control of the unsecured second processor. The first processor will generate the random number, will receive the message of the security module, will decipher said message and will load the common key into the decryption unit. It should be noted that the decryption (or encryption) unit could be realized in form of software by this first processor.

Decentralization of the keys management and of the processing processes in the deciphering unit (DMX), respectively in the decompression unit (MPEG) by suitable processors that manage said units independently of the central processor (CPU). The encryption (EC) and decryption (DC) units are implemented in the form of hardware elements in the deciphering (DMX) and decompression (MPEG) units included in the processing unit (UT). They can also be in form of software as micro-code managed by the processor dedicated to secure operations according to any of the three solutions described above. These software elements are coordinated and their tasks are attributed by the "middleware" (MD) software.

The random access memory (RAM) can be similar to that used in personal computers, such as for example a SDRAM memory (Synchronous Dynamic Random Access Memory) or a SRAM memory (Static Random Access Memory) benefiting from faster access time.

According to one example of configuration, the decoder can have a bus (B) to which several kinds of storage units can be connected, such as the random access memory (RAM), an erasable programmable memory (EEPROM) or Flash EEPROM, or one or several hard disks (HD). Moreover, the encrypted audio/video data can be forwarded towards a local network (LAN) via the bus (B) and a port (P) in order to be used by other decoders or processing units. The security of this data is ensured by its encryption with the common key (Ki). The processing units or decoders connected to this network (LAN) are equipped to manage and decrypt the audio/video data according to the rights stored in their security module.

In order to optimize the processing speed, encryption at the level of the encryption unit (EC) is generally carried out with a fast algorithm involving a process of mixing blocks and/or addresses. For instance, the data blocks can be encoded by way of a function XOR (or exclusive) whose parameters are determined by the common key (Ki). A similar function can also code the memory addresses attributed to different blocks to be stored. Another encryption method includes coding the order in which the blocks are stored in the memory by way of the common key (Ki). This kind of address mixture can be easily achieved by a FPLA circuit (Field Programmable Logic Array) included in the encryption unit (EC). Obviously, other more sophisticated algorithms can be used for this encryption.

The encryption with the common key (Ki) can be only partial, that is to say, it only concerns a part of the data blocks to be stored or a part of the memory addresses in which these blocks will be stored. Preferably, the encryption will carry the data addressed to the final user (payload) such as the images and the sound and not the heading of the data packets or the files serving to process them.

In a first alternative, the common encryption key (Ki) is transmitted by a management center or by the head end of the broadcasting network by way of a management message (EMM). This message (EMM), also containing the deciphering rights of the audio/video data pertaining to each user, is processed by the security module (SM) generally in the form of a smart card inserted into a suitable reader of the decoder (STB). This common encryption key (Ki) is capable of changing with each change of the broadcasting channel, which implies that the broadcasted new management message (EMM) contains a new common key (Ki).

According to an alternative used when the number of messages transmitted by the management center or by the network head end has to be reduced, the common key (Ki) can be generated by the security module (SM). This process is carried out independently of the management messages (EMM) as long as the rights included in the latter are valid and allow the decryption of the data (DT) by the deciphering unit (DMX). In fact, since the security module (SM) receives the control messages ECM comprising the control-words (CW) included in the audio/video (DT) data stream, it has the information of a channel change that allows it to generate a new common key (Ki).

On reception of audio/video data (DT), the deciphering unit (DMX) deciphers said data with a control word (CW) that the security module (SM) extracts from a control message ECM. This control word (CW) is transmitted to the deciphering unit (DMX) either in clear, encrypted with the personal key Kec of the encryption unit (EC) or by another key provided to the deciphering unit (DMX) by the "middleware" (MD) software.

At the same time, the security module obtains a common key (Ki) and encrypts this key with the personal key (Kec) of the encryption unit (EC). The key (Ki) comes either from a management message (EMM) or from the security module itself that generates it, as described above.

This cryptogram Kec(Ki) is transmitted to the encryption unit (EC) that extracts from it the common key (Ki) and with which it re-encrypts the data deciphered by the deciphering unit (DMX).

According to an example alternative embodiment, the access control method (DT) to the digital audio/video data received by a processing unit (UT) comprising a deciphering unit (DMX) of the audio/video data, a decompression unit (MPEG), an input/output interface of the processed audio/video data and communication device towards a security module (SM), the decryption (DMX) and decompression (MPEG) units comprising respectively an encryption unit (EC) and a decryption unit (DC) using at least one personal key (Kec, Kdc) and one common encryption key (Ki), the method comprising:

reception of a control message (ECM) containing a control word (CW) by the security module (SM), obtaining by the security module a common key Ki and generation of a cryptogram Kec(Ki, CW, H(Ki, CW)) encrypted with the personal key Kec of the encryption unit (EC) comprising the common key (Ki), the control word (CW), and a first digest H(Ki, CW).

transmission of the cryptogram Kec(Ki, CW, H(Ki, CW)) to the deciphering unit (DMX), decryption with the key Kec of said cryptogram and verification of the integrity of the common key Ki and of the control word CW.

loading of the common key (Ki) in the encryption unit (EC) and authorization of the deciphering of the audio/video data with the control word (CW) when the result of the verification is positive.

deciphering of the audio/video data and encryption of said data by the encryption unit (EC) with the common key (Ki), transmission of said re-encrypted data to the decryption unit (DC), selection by the security module of the common key (Ki) specific to audio/video data, transmission of a random number (AL) by the decryption unit (DC) to the security module (SM), formation and subsequent transmission of a cryptogram Kdc(Ki, AL, H(Ki, AL)) encrypted with the personal key (Kdc) of the decryption unit (DC) containing at least the common key, (Ki) the random number (AL), and a second digest H(Ki, AL), reception of the cryptogram Kdc(Ki, AL, H(Ki, AL)) by the decryption unit (DC), decryption of said cryptogram with the personal key Kdc of said decryption unit (DC) and verification of the integrity of the common key (Ki) and of the random number (AL).

when the result of the verification is positive, comparison of the random number received (AL) with the one previously generated, loading of the common key (Ki) and decryption of the audio/video data if the result of the comparison is positive.

The security module (SM) transmits the common key (Ki) with the control word (CW), this set being encrypted with the personal key (Kec) to the deciphering unit (DMX) and to the encryption unit (EC). In order to ensure its integrity, this cryptogram Kec(Ki, CW) can also includes a digest H(Ki, CW) constituting an authentication code or MAC (Message Authentication Code). This code is generally calculated from the common key (Ki) and the control word (CW), in general with a unidirectional hashing function of the type MD2, MD4, MD5 (Message Digest) or SHA, (Secure Hash Algorithm).

On reception of the cryptogram Kec(Ki, CW, H(Ki, CW)), the secured processor deciphers it with the key (Kec) then calculates a digest H(Ki, CW))' from the key (Ki) and control word (CW) received and compares it with the digest received H(Ki, cw). The key (Ki) and the control word (CW) will not be recognized as valid unless the comparison of the digest H(Ki, CW))' calculated with that H(Ki, cw) received gives a positive result. The secured processor is then authorized to load the control word into the deciphering unit (DMX) as well as the common key into the encryption unit (EC). This allows the deciphering of the audio/video data with the control word (CW) and the encryption of the data deciphered by the encryption unit (EC).

One advantage of matching the common key (Ki) with the control word (CW) is that it becomes impossible to cross two input streams in a decoder equipped with two reception systems or "tuner". The common key (Ki) of a stream authorizing a cost-free decryption cannot replace the common key (Ki) of a stream including restricted rights. The crossing of two messages would result in the control words also being crossed. A control word different to that, which is expected would make the deciphering void.

This alternative is particularly pertinent when loading the encryption and decryption key during the same operation. In a direct mode, it is possible not to apply the protocol by implementing a random variable to load the common key into the decryption unit (DC). The secured processor, responsible for the security operations in the processing unit of the invention, receives a message encrypted with its personal key containing the control word and the common key (Ki). This key is simultaneously loaded into the encryption unit and the decryption unit. In order to ensure that the good key has been loaded and that an interface program has not replaced one message with another, the presence of the control word prohibits all message changes. Only the original message can be used to obtain the stream in clear.

It should be noted that in one implementation implementing a secured processor or a central processor having a secured mode, the personal key (Kec) of the encryption unit (EC) and the decryption (DC) unit is identical and is in fact the personal key of the secured processor.

The data re-encrypted by the encryption unit (EC) with the common key (Ki) is for example stored on a hard disk (HD) or in a non-volatile memory (EEPROM) in order to be decrypted afterwards. The security module (SM) creates a cryptogram KL(Ki, ID) made up of the common key (Ki) and an identifier (Id) of the contents (C), this set being encrypted with a local key (KL) of the security module (SM). This cryptogram can be stored either on the hard disk (HD) with the contents encrypted with the common key (Ki), or in the security module (SM) or in a separated memory.

It should be noted that this cryptogram can be encrypted with other personal keys such as for example the personal key (Kec) of the encryption unit (EC) or that (Kdc) of the decryption unit (DC) that are known by the security module (SM).

This re-encrypted data can also be forwarded towards a local network (LAN) via the port (P) for their processing and immediate or deferred visualization. In the latter case, the data is stored on a hard disk or other memory unit of a processing unit or decoder member of the local network (LAN). Its decryption will be thus carried out by a processing unit or decoder different to that with which it was encrypted.

At the time of the reading of the encrypted contents Ki(C) stored on the hard disk (HD), the cryptogram KL(Ki, ID) is transmitted by the "middleware" (MD) software to the security module (SM) that deciphers it using the key (KL) for extracting the identifier (Id). This is interpreted by the security module that determines a parameter related to the exploitation of the corresponding stored audio/video data, for example, to the number of authorized readings of the contents (C) once they have been decrypted. Then the security module (SM) sends an order to the decryption unit (DC) that generates a random number or variable (AL) and transmits it to the security module (SM). The latter prepares a new cryptogram Kdc(Ki, AL) made up of the random variable (AL) and the common key (Ki) previously extracted from the cryptogram KL(Ki, ID), this set being encrypted with the personal key (Kdc) of the decryption unit (DC). This cryptogram Kdc(Ki, AL) is transmitted to the decryption unit (DC) that decrypts it with its personal key (Kdc). The random variable (AL) received and extracted from the cryptogram Kdc(Ki, AL) is then compared with the random variable (AL) generated previously. If both random variables (AL) correspond, the common key (Ki) is considered as valid. It is then loaded into the decryption unit (DC), which in this way obtains the content (C) in clear. The decompression unit (MPEG) decompresses the content obtained (C) and converts it into an analogical audio/video signal (AV) of the base band type (video composite, RGB) compatible with a television set, for example.

In the systems described in the cited documents U.S. Pat. No. 6,286,103 and WO00/57636, the random number plays respectively a role of securing the data transmission between the security module and the apparatus and a role of verification of the authenticity of the security module. In at least one embodiment of the present invention, it is used for verifying the validity (or the service time) of the common key allowing decrypting the data in order to prevent the non-authorized copy of data encrypted with a key that should be lapsed. Furthermore, the fact to request the security module at each decryption ensure a security to the data even the apparatus is not reliable. In fact, the common key is either generated, either controlled after reception of an administration message EMM by the security module alone.

According to one alternative embodiment, the random number (AL) generated by the decryption unit (DC) can be transmitted in an encrypted form with the personal key (Kdc) of said decryption unit (DC). The security module (SM) having this personal key Kdc will be able to decrypt the random variable (AL) to form the cryptogram Kdc(Ki, AL). In order to ensure its integrity, the random number (AL) can also be transmitted accompanied by a digest H(AL) calculated from said random number (AL), this assembly being encrypted with the personal key (Kdc) of the decryption unit (DC).

According to another alternative embodiment, the cryptogram Kdc(Ki, AL) includes a digest H(Ki, AL) calculated by the security module (SM) from the common key (Ki) and the random number (AL) to form the cryptogram Kdc(Ki, AL, H(Ki, AL)). When this cryptogram is received by the decryption unit (DC), first it verifies the digest H(Ki, AL) by making a comparison with a digest H(Ki, AL)' that it calculates with the key (Ki) and the number (AL) extracted from the cryptogram and the digest H(Ki, AL) extracted from the cryptogram. If the results of this comparison and that of the random numbers (AL), as described above, are positive, the common key (Ki) is loaded into the decryption unit (DC) and the decryption of the contents can be performed.

In one alternative embodiment, the cryptogram KL(Ki, ID) accompanying the stored contents Ki(C) can include other data related to the contents (C) such as for example a title T, the duration D or a code N indicating the type of contents (sport, film, reportage etc &). The cryptogram can be symbolized by KL(Ki, ID, T, D, N).

An advantage of this type of cryptogram KL(Ki, ID, T, D, N) is the possibility of managing the rights contents according to its nature and time. Indeed, the identifier (ID), and the code (N) for example, allow the security module to limit the number of visualizations.

At the time of the direct or "live" visualization of content, that is to say, without durable recording in a memory unit, the processing unit deciphers the contents with the aid of the control word (CW), and then encrypts it with the common key (Ki) in order to decipher it directly before decompression. During a first step, the security module (SM) stores the control word (CW) and an identifier (ID) of the content (C) to determine if the decryption with the common key (Ki) can take place or not according to the rights contained in the security module (SM).

In this "live" mode, the common key (Ki), obtained by the security module (SM), is transmitted at the same time to the encryption unit (EC) and to the decryption unit (DC). This key Ki is transmitted either encrypted with the personal keys (Kec, Kdc) of the respective units (EC, DC) or only encrypted with the key (Kec) of the encryption unit (EC). In the latter case, it is transmitted to the decryption unit (DC) by a secured direct material connection (CS) linking said decryption unit (DC) to the encryption unit (EC). The control step using the random number (AL) as in the mode of reading stored data is not furthermore necessary because the decryption unit (DC) receives the key (Ki) from a secure source.

Any of the aforementioned methods may be embodied in the form of a system or device, including, but not limited to, any of the structure for performing the methodology illustrated in the drawings.

Further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A processing unit for digital audio/video data encrypted with one or several control-words coming from control messages, the processing unit including a deciphering unit for deciphering the audio/video data, a decompression unit, an input/output interface of the processed audio/video data and a communication device for communicating with a security module associated with the processing unit, wherein the security module is configured for:
receiving a control message containing a control word,
obtaining a common key and generating a first cryptogram made up of a set including the common key, the control word and a digest calculated from the common key and the control word using a unidirectional hash function, the set being encrypted by a personal key of the deciphering unit, and
transmitting the first cryptogram to the deciphering unit, the deciphering unit including an encryption unit provided with at least the personal key and the common key, the deciphering unit configured for:
decrypting the first cryptogram using the personal key,
verifying integrity of the common key and the control word by comparing the digest calculated by the security module with a digest calculated by the deciphering unit using the received common key and control word,
loading the common key in the encryption unit of the deciphering unit and authorizing the deciphering of the audio/video data with the control word, when the verification has been successful,
deciphering the audio/video data and encrypting the audio/video data by the encryption unit using the common key, and
transmitting said re-encrypted audio/video data to the decompression unit, the decompression unit including a decryption unit provided with at least one personal key and the common key, the decompression unit configured for:
generating and transmitting a random number to the security module and the decompression unit further configured for selecting the common key specific to the audio/video data, for generating a second cryptogram made up of a set including at least the common key and the random number, the set being encrypted by the personal key of the decryption unit and for transmitting the second cryptogram to the decryption unit,
decrypting the second cryptogram received from the security module using the personal key of the decryption unit and verifying the integrity of the random number by comparing the received random number with the previously generated random number, and
loading the common key into the decryption unit and decrypting the audio/video data with the common key when the verification is successful.

2. The processing unit according to claim 1, further including immediate or deferred blocking device of the decryption unit when the verification is unsuccessful.

3. The processing unit according to claim 1, further comprising a processor including a secured execution domain implemented in a hardware part of the core of said processor, a data and a secured code being marked and divided within the processor by maintaining a distinct hardware separation between secured and unsecured data in said processing unit.

4. The processing unit according to claim 1, comprising a first and a second processor, the first processor executing a secured code being isolated against all external access and against an unauthorized control from the second processor executing unsecured operations.

5. The processing unit according to claim 1, wherein the deciphering and decompression units each include a processor independent from a central processor, controlled by a "middleware" software, the "middleware" software including a management device for managing data access and data exchanges carried out by the encryption unit and the decryption unit from and to a memory unit.

6. The processing unit according to claim 1, wherein the encryption unit and decryption unit are implemented in form of hardware elements in the deciphering and decompression units.

7. The processing unit according to claim 1, wherein the encryption unit and decryption unit are implemented in form of a micro-code managed by a processor of the deciphering and decompression units.

8. The processing unit according to claim 1, wherein the input/output interface is connected to a bus, the encryption unit and decryption unit being connected to the bus and, wherein a memory unit includes at least one of at least one random access memory for intermediate storing of the audio/video data being processed and at least one hard disk.

9. The processing unit according to claim 8, wherein the input/output interface, connected to the bus, includes an input/output port, the input/output port forwarding the audio/video data encrypted by the encryption unit to a local network.

10. The processing unit according to claim 1, wherein the processing unit being in form of a module integrated into a personal computer.

11. The processing unit according to claim 1, wherein the processing unit being in form of a module integrated into a Pay-TV decoder.

12. A method for controlling access to digital audio/video data received by a processing unit, the processing unit including a deciphering unit for deciphering the audio/video data, a decompression unit, an input/output interface of the processed audio/video data and communication device for communicating with a security module associated with the processing unit, the deciphering and decompression units respectively including an encryption unit and a decryption unit, each of the encryption unit and decryption unit using at least one personal key and one common key, the method comprising:

receiving, by the security module, of a control message containing a control word;

obtaining, by the security module, of a common key and generating a first cryptogram made up of a set including the common key, the control word and a digest calculated from the common key and the control word using a unidirectional hash function, the set encrypted with the personal key of the encryption unit;

transmitting the first cryptogram to the deciphering unit, the decrypting unit decrypting the first cryptogram with the personal key of the encryption unit;

verifying integrity of the common key and the control word by comparing the digest calculated by the security module with a digest calculated by the deciphering unit using the received common key and control word;

loading the common key into the encryption unit and authorizing the deciphering of the audio/video data with the control word when the verification is successful deciphering the audio/video data and encrypting, by the encryption unit, the audio/video data using the common key;

transmitting the re-encrypted audio/video data to the decryption unit;

selecting, by the security module, the common key specific to the audio/video data;

generating and transmitting a random number by the decryption unit to the security module;

generating, by the security module, a second cryptogram made up of a set including at least the common key and the random number, the set being encrypted by the personal key of the decryption unit;

transmitting the second cryptogram to the decryption unit;

decrypting the second cryptogram with the personal key of said decryption unit and verifying integrity of the random number by comparing the received random number with the previously generated random number; and loading the common key and decrypting the audio/video data with the common key when the verification is successful.

13. The method according to claim 12, wherein the second cryptogram further comprises a digest calculated by the security module from the common key and the random number using a unidirectional hash function, the digest verifying integrity of the common key and of the random number after decryption of the second cryptogram using the personal key of the decryption unit, the received random number being compared with the random number previously generated when the verification is successful.

14. The method according to claim 12, wherein the decryption unit is blocked either immediately or after decryption of a predetermined number of audio/video data blocks when the result of the comparison is unsuccessful.

15. The method according to claim 13, wherein digest of the first cryptogram and the digest of the second cryptogram respectively constitute a first authentication code calculated from the common key and from the control word and a second authentication code calculated from the common key and the random number, said codes being calculated using unidirectional hash function.

16. The method according to claim 12, wherein the common key is generated by the security module.

17. The method according to claim 12, wherein the common key is extracted from a management message received from a management center.

18. The method according to claim 12, wherein the audio/video data deciphered and re-encrypted with the common key is stored in a memory unit, the audio/video data being subsequently decrypted.

19. The method according to claim 12, wherein the deciphered audio/video data re-encrypted with the common key are forwarded to a local network via a port of the processing unit, the immediate or deferred decryption of the re-encrypted audio/video data being carried out by a processing unit member of said local network.

20. The method according to claim 12, wherein the security module creates and stores, at the time of the transmission of the audio/video data to the decryption unit, a control cryptogram encrypted with a local key of said security module containing at least one identifier of the audio/video data and the common key, said common key being selected by decrypting the control cryptogram with the local key and the at least one identifier being read by the security module, the security module determining a parameter related to the exploitation of the stored audio/video data.

21. The method according to claim 20, wherein the control cryptogram is stored in the security module.

22. The method according to claim 20, wherein the control cryptogram is stored in the memory unit and accompanies the audio/video encrypted data.

23. The method according to claim 20, wherein the control cryptogram encrypted with the local key of the security module and containing the common key includes additional data related to the nature and the type of the audio/video data stored in the memory unit.

24. The processing unit according to claim 1, wherein the second cryptogram further includes a digest calculated by the security module from the common key and the random number with a unidirectional hash function, and the decryption unit is further configured for verifying the integrity of the common key and of the random number after decryption of the second cryptogram with the personal key of the decryption unit, the received random number being compared using the previously generated random number only when the verification is successful.

* * * * *